(12) United States Patent
Carlsson et al.

(10) Patent No.: US 8,406,995 B2
(45) Date of Patent: Mar. 26, 2013

(54) PROVIDING TIME TABLE INFORMATION

(75) Inventors: Stefan Carlsson, Bjärred (SE); Simon Ekstrand, Eslöv (SE); Jesper Alsed, Jonstorp (SE)

(73) Assignee: Vodafone Group PLC, Newbury, Berkshire (GB)

( * ) Notice: Subject to any disclaimer, the term of this patent is extended or adjusted under 35 U.S.C. 154(b) by 300 days.

(21) Appl. No.: 12/799,351

(22) Filed: Apr. 22, 2010

(65) Prior Publication Data

US 2011/0010084 A1 Jan. 13, 2011

Related U.S. Application Data

(60) Provisional application No. 61/202,993, filed on Apr. 27, 2009.

(30) Foreign Application Priority Data

Apr. 23, 2009 (EP) .................................. 09158645

(51) Int. Cl.
*G01C 21/00* (2006.01)
(52) U.S. Cl. ........................................ 701/408
(58) Field of Classification Search ............ 701/1, 400, 701/300, 408–410, 414, 465, 467, FOR. 108, 701/FOR. 111
See application file for complete search history.

(56) References Cited

U.S. PATENT DOCUMENTS

| 7,512,481 B2 * | 3/2009 | Julich et al. .............. 701/117 |
| 7,693,652 B2 * | 4/2010 | Cheung ...................... 701/467 |
| 2004/0049341 A1 | 3/2004 | Fujiwara |
| 2011/0001751 A1 * | 1/2011 | Carlsson et al. ........... 345/419 |

FOREIGN PATENT DOCUMENTS

| DE | 100 23 160 A1 | 11/2000 |
| EP | 1 024 467 A2 | 8/2000 |
| EP | 1 085 299 A2 | 8/2000 |
| EP | 1 189 176 A2 | 8/2001 |
| EP | 1 936 328 A1 | 6/2008 |
| JP | 10-170288 | 6/1998 |
| JP | 2006-084436 | 3/2006 |
| JP | 2006242888 | 9/2006 |
| WO | WO 02/41028 A2 | 5/2002 |

OTHER PUBLICATIONS

U.S. Appl. No. 12/799,354, filed Apr. 22, 2010, Carlsson.

* cited by examiner

*Primary Examiner* — Faye M. Fleming
(74) *Attorney, Agent, or Firm* — Muirhead and Saturnelli, LLC

(57) ABSTRACT

A method of providing time table information and navigation instructions comprises receiving position data associated with a number of pre-determined positions along a transportation route, receiving time table data, receiving position data associated with a reference position, and determining a number of connection routes from the reference position to at least one of the pre-determined positions. Corresponding device and computer program product are also provided.

19 Claims, 6 Drawing Sheets

500a

500b

PROVIDING TIME TABLE INFORMATION

RELATED APPLICATIONS

This application claims priority to U.S. Provisional App. No. 61/202,993, filed Apr. 27, 2009, which is incorporated herein by reference.

TECHNICAL FIELD

This application relates to the field of digital maps and, more particularly, to a method, a device and a computer program product for providing personalized time table information.

BACKGROUND OF THE INVENTION

In order to efficiently plan and conduct a journey using public transport, such as trains, buses or ferries, it is in most cases desirable to consult scheduling information of the relevant transportation mean. Scheduling information is often provided as time tables. Using the relevant time table(s) a user may then create a travel itinerary. Time table information for public transport is often provided in printed form at terminals, local stops, ticket offices and the like. Time table information may also be provided in electronic form. Electronic time table information may for example be provided as webpages of the travel company. Thus by browsing the webpage of the travel company the user may access time table information and print it to paper or otherwise store it for later usage.

Recently electronic map data has been associated with time table information. For example, the electronic map may be configured to display information regarding not only terminals or local stops, but also which trains, buses or ferries which arrive and/or depart from the displayed terminals or local stops. Even more so, in the electronic map data the displaying of terminals or local stops has recently also been configured to display time tables associated with the terminals or local stops. Thus by browsing an electronic map a user may be provided with time table information relating to departure times and arrival times of public transportation serving a terminal or a local stop by clicking or otherwise select an icon or the like representing the terminal or the local stop. However there is still a need to provide more personalized map information.

Accordingly, it would be desirable to solve or at least reduce the problems discussed above. In particular, it would be desirable to provide more personalized map information and to provide a method, a device, and a computer program product relating time table information to a position of a user. It would further be desirable to provide a method, a device, and a computer program product that, in a simplified way, provides improved planning of a journey involving public transport.

SUMMARY OF THE INVENTION

According to a first aspect of the system described herein, a method comprises receiving position data associated with a number of pre-determined positions along a transportation route, receiving time table data, the time table data associating each of the number of pre-determined positions to a point of time, receiving position data associated with a reference position, determining a number of connection routes from the reference position to at least one of the pre-determined positions, each of the number of connection routes being associated with one of the pre-determined positions, receiving a mode of transportation from the reference position to the at least one of the pre-determined positions, the mode of transportation being associated with a speed, determining for each of the number of connection routes a time for transportation from the reference position to the at least one of the pre-determined positions by using the speed, receiving a reference time point; determining for each of the number of connection routes a time of arrival by adding the time for transportation to the reference time point, determining at least one recommended connection route from the reference position to the at least one of the pre-determined positions, by, for each of the number of connection routes, in case the time of arrival is prior to the point of time associated to the pre-determined position associated with the connection route, setting the connection route as a recommended connection route, and transmitting data pertaining to the at least one recommended connection route to a display.

The pre-determined positions may be terminals or local stops along a (public) transportation route. Thus one advantage may be that the method enables improved planning of a journey involving public transport since there is provided route information pertaining to at least one route from the reference position to the terminals or local stops, and wherein the route information is dependent on time table data.

The reference position may be a current position of the device.

Thus one advantage may be that there may be provided information relating a current position of the device to one or more terminals or local stops. Thereby a user may be provided with information regarding a preferred route from his current position to the most advantageous (in times of travel distance and/or time) terminal or local stops.

The reference time point may be a current time point.

Thus one advantage may be that a user may receive real-time information pertaining to a route from his current position to the at least one pre-determined positions.

The method may further comprise classifying the pre-determined positions associated with the at least one recommended connection route into at least one class based on the time of arrival.

The classes may for example be associated with how likely it is to reach a pre-determined position before a transportation unit reaches it. Thus, one advantage may be that a user may receive information relating to how likely it is that he may reach a terminal or stop on time. Likewise, the may receive information relating to if he is in a hurry of not.

The method may further comprise indicating the pre-determined positions associated with the at least one recommended connection route based on the at least one class.

The indicating may comprise associating a colour with each of the at least one class.

The indicating may comprise associating a size with each of the at least one class.

The method may further comprise determining interpolated position data by using the time table data, the interpolated position data associating points of the transportation route to points of time, and transmitting data pertaining to the interpolated position data to the display.

Thus one advantage may be that a user may receive information regarding the (predicted) current position of the train, bus or ferry to catch, thereby further enhancing the planning of the route from the reference position to one of the pre-determined positions.

The method may further comprise receiving position data associated with a transportation unit, updating the time table data by extrapolating the position data associated with the transportation unit, and transmitting data pertaining to the current position data to the display.

Thus one advantage may be that the transmitted information may be dependent on the transportation unit of the user. This may enable more accurate information regarding routes and connection travel times from the reference position to one of the pre-determined positions.

The method may further comprise determining a selected connection route by receiving a user input actuation indicating one of the at least one recommended connection route, determining navigation instructions based on the selected connection route, and transmitting data pertaining to the navigation instructions to the display.

Thus one advantage may be that such navigation information may further aid the user on his route from the reference position to a selected pre-determined position.

The method may further comprise determining target time data, the target time data associating points of the selected connection route with points of time, by interpolation using the reference time point and the point of time associated to a pre-determined position associated to the selected connection route, and transmitting data pertaining to the target time data to the display.

Thus one advantage may be that such target time data may provide information regarding travelling margins associated with a user taking a certain time to complete a particular route from the reference position to one of the pre-determined positions According to a second aspect of the system described herein, a device comprises a receiver for receiving position data associated with a number of pre-determined positions along a transportation route, time table data, the time table data associating each of the number of pre-determined position to a point of time position data associated with a reference position, a mode of transportation from the reference position to the at least one of the pre-determined positions, the mode of transportation being associated with a speed, and a reference time point, a processing unit arranged to determine a number of connection routes from the reference position to at least one of the pre-determined positions by using the speed, to determine, for each of the number of connection routes a time of arrival by adding the time for transportation to the reference time point, and to determine at least one recommended connection route from the reference position to the at least one of the pre-determined positions, by, for each of the number of connection routes, in case the time of arrival is prior to the point of time associated to the pre-determined position associated with the connection route, setting the connection route as a recommended connection route, and a transmitter for transmitting data pertaining to the at least one recommended connection route to a display.

The processing unit may further be arranged to classify the pre-determined positions associated with the at least one recommended connection route into at least one class based on the time of arrival.

According to a third aspect of the system described herein, a system comprises a device according as disclosed above and a display arranged to receive data from the device.

According to a fourth aspect of the system described herein, a computer program product stored on a computer-readable medium comprising computer program code portions adapted to perform the method as disclosed above when loaded and executed on a computer.

The second, third and fourth aspects may generally have the same features and advantages as the first aspect.

Other features and advantages of the present system described herein will appear from the following detailed disclosure as well as from the drawings.

Generally, all terms used in the claims are to be interpreted according to their ordinary meaning in the technical field, unless explicitly defined otherwise herein. All references to "a/an/the [element, device, component, unit, means, step, etc]" are to be interpreted openly as referring to at least one in-stance of said element, device, component, unit, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments of the system described herein will be explained in more detail herein with reference to the appended drawings, where the same reference numerals will be used for similar elements, and which are briefly described as follows.

DETAILED DESCRIPTION OF VARIOUS EMBODIMENTS

In the accompanying drawings certain embodiments are shown. The system described herein may, however, be embodied in many different forms and should not be construed as limited to the embodiments set forth herein; rather, these embodiments are provided by way of example so that this disclosure will be thorough and complete, and will fully convey the scope of the invention to those skilled in the art. Devices will be described in an operating mode.

Figure 1:
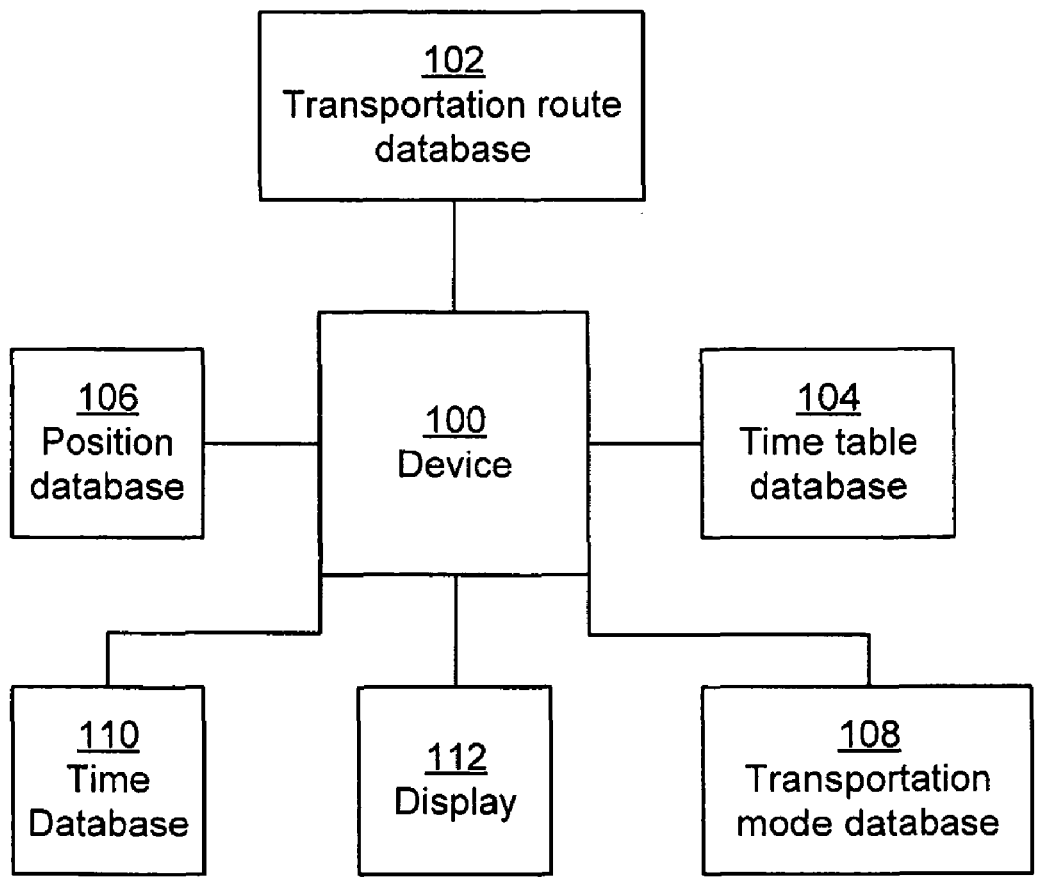
FIG. 1 is a schematic view of a device according to various embodiments.

FIG. 1 is a schematic view of a device 100 according to various embodiments of the system described herein. The device 100 may be (part of) a mobile communications device, such as a mobile phone, a personal digital assistant (PDA), a laptop computer, and the like. The device 100 is configured to be wired or wirelessly operatively connected to inter alia a transportation route database 102, a time table database 104, a position database 106, a transportation mode database 108, a time database 110 and a display 112. The transportation database 102 comprises position data associated with a number of pre-determined positions along a transportation route. For example the transportation route may be associated with a route for a public means of transportation such as a bus line, an underground line, a train line, a tram line, a ferry line or the like. Further, the pre-determined positions along the transportation route may correspond to terminals or (local) stops on a bus line, underground line etc. The time table database 104 comprises time table data associating each of the pre-determined positions to a point of time, typically given in terms of day, hour and minutes. The position database 106 comprises position data associated with a reference position. The reference position may relate to any geographical position. In particular the reference position may correspond to a current position of the device. The transportation mode database 108 comprises different modes of transportation, such as walking, running, biking, driving etc. Further, it may comprise information relating to the speed of different modes of transportation. For example, it may comprise an average walking speed, running speed, biking speed or driving speed. The time-database 110 comprises data relating to a reference time point. The reference time point may correspond to a past time, such as three o'clock yesterday afternoon, a current time point, or a future time point, for example eight o'clock tomorrow morning.

The display 112 is arranged to present information, such as routes, to a user. It may be of any known type of display such as a liquid-crystal display (LCD) or a plasma display panel (PDP). The display 112, as well as some of said databases 102, 104, 106, 108, 110 may be comprised in the device 100.

Figure 2:
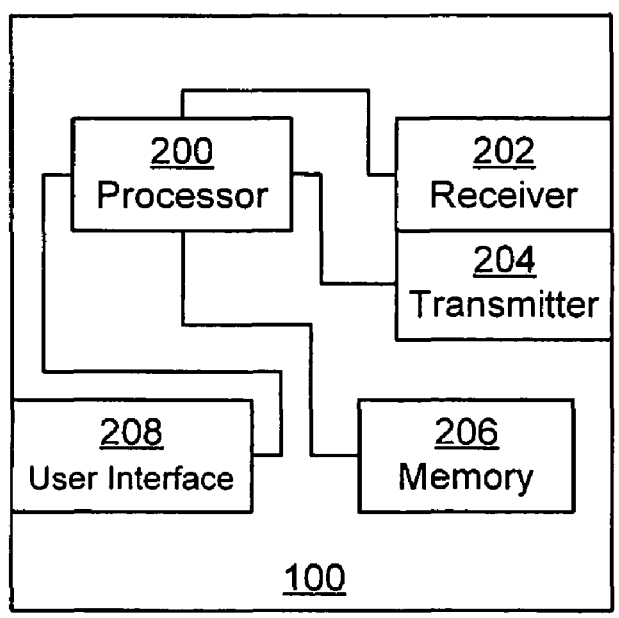
FIG. 2 is a schematic view of internal components of a device according to various embodiments.

FIG. 2 is a schematic view of internal components of the device 100 of FIG. 1 according to various embodiments of the system described herein. The device 100 comprises a processing unit 200, or processor, which may be a central processing unit (CPU). The processing unit 200 is arranged to be operatively connected to a receiver 202, a transmitter 204, a memory 206, and a user interface 208. The receiver 202 is configured to receive data signals from external units, devices, and apparatuses in any known manner. For example, the receiver 202 may be configured to receive data from the transportation route database 102, the time table database 104, the position database 106, the transportation mode database 108 and the time database 110.

Further, the receiver 202 may be configured to receive satellite signals relating to position and/or time, such as signals from the global positioning system (GPS). Likewise, the transmitter 204 is configured to transmit data signals to external units, devices, and apparatuses in any known manner. The receiver 202 and the transmitter 204 may be part of a common transceiver configured to both receive and transmit data. The memory 206 may be configured to store software instructions pertaining to a computer-implemented method. The memory 206 may thus form a computer-readable medium which may have stored thereon software instructions. The software instructions may cause the processing unit 200 to execute the method according to embodiments of the system described herein.

The user interface 208 is arranged to receive user instructions and to present data processed by the processing unit 200 and/or received by the receiver 202 to a user. The user interface 208 may be operatively connected to the display 112. The user instructions may pertain to operations to be performed on the data items displayed by the display 112. Particularly, the user instructions may pertain to selecting a connection route. Further, the user instructions may pertain to a reference time point and/or a reference position.

Figure 3:
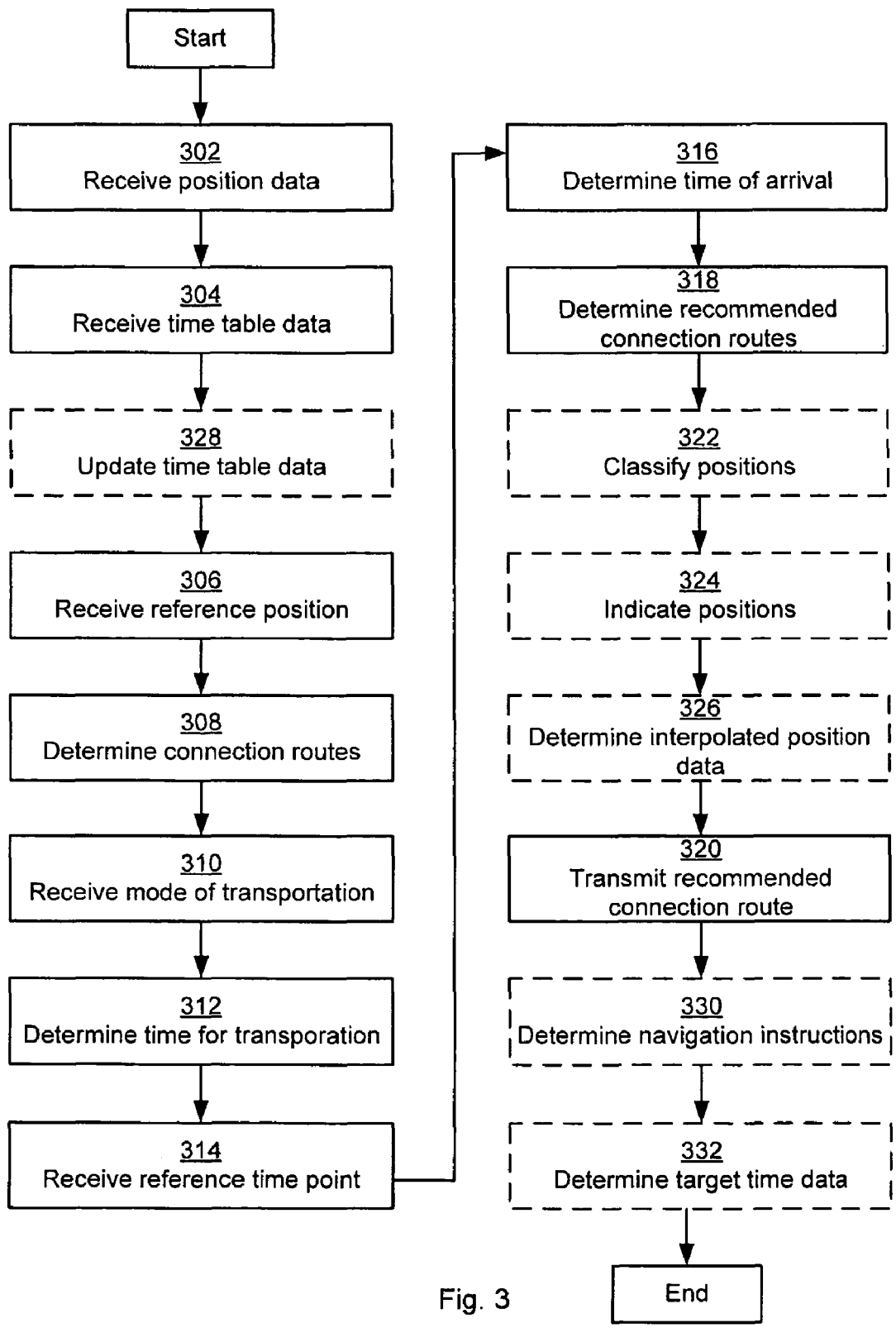
FIG. 3 is a flowchart according to various embodiments.

A method according to embodiments of the system described herein will now be described with reference to the flowchart of FIG. 3.

In step 302 position data associated with a number of pre-determined positions along a transportation route is received. The position data may for example be received from the transportation route database 102. As illustrated in the display view 400 of FIG. 4, a transportation route 402 may comprise a route for some unit of (public) transportation 406. For example, the transportation route 402 may correspond to a bus line, a train line, a tram line, a ferry line, etc, and the transportation unit 406 may include a bus, train, tram, ferry and/or other type of vehicle. Further, the pre-determined positions 404a-f along the transportation route 402 may correspond to terminals or (local) stops or stations on the transportation route, such as bus stops, train stations, tram stops, underground stations, or ferry terminals. The position data typically comprises geographical coordinates of the pre-determined positions 404a-f.

Optionally, the step 302 may be responsive to a user input which provides information relating to an identification of the transportation route. For example, the user input may comprise an identification of a specific bus line such as "bus line 3". The user input may for example be received by the user interface 208.

In step 304 time table data is received. The time table data may be received from the time table database 104. The time table data comprises data which associates each of the pre-determined positions along the transportation route to a point in time. For example, the time table data may associate the pre-determined positions 404a-f with the time points 2:00 PM, 2:05 PM, 2:11 PM, 2:20 PM, 2:27 PM: 2:38 PM, respectively. Typically, these time points may correspond to the times when the transportation unit 406 is scheduled to stop at the pre-determined positions 404a-f.

Optionally, the step 304 may be responsive to a user input which provides information relating to a time. For example, the user input may comprise a date and time or a time interval. In the example above, the time table data may be received as a response to a user input of 2:10 PM. The user input may for example be received by the user interface 208.

In step 306 position data associated with a reference position is received. The position data may be received from the position database 106. Alternatively, the position data may be received from a satellite signal or from a user input, for example via the user interface 208. The position data may comprise geographical coordinates of a reference position. As illustrated in the display view 400 of FIG. 4, the reference position 408 may correspond to any geographical position, such as an address or location. In some embodiments the reference position corresponds to the current position of the device 100.

In some embodiments the position data associated to a reference position may be used to identify relevant transportation routes. For example, the reference position 408 of FIG. 4 may be used to identify the transportation route 402 as being the closest transportation route from a plurality of transportation routes.

Step 308 comprises determining a number connection routes from the reference position to at least one of the pre-determined positions. A connection route is a route which enables a user to travel from the reference position to one of the pre-determined positions. Each connection route is associated with one of the pre-determined positions. However, there may be several connection routes associated with each pre-determined position. Such a situation is illustrated in the display view 800 of FIG. 8 where the pre-determined position 404d is associated with the connection routes 802 and 804.

Figure 4:
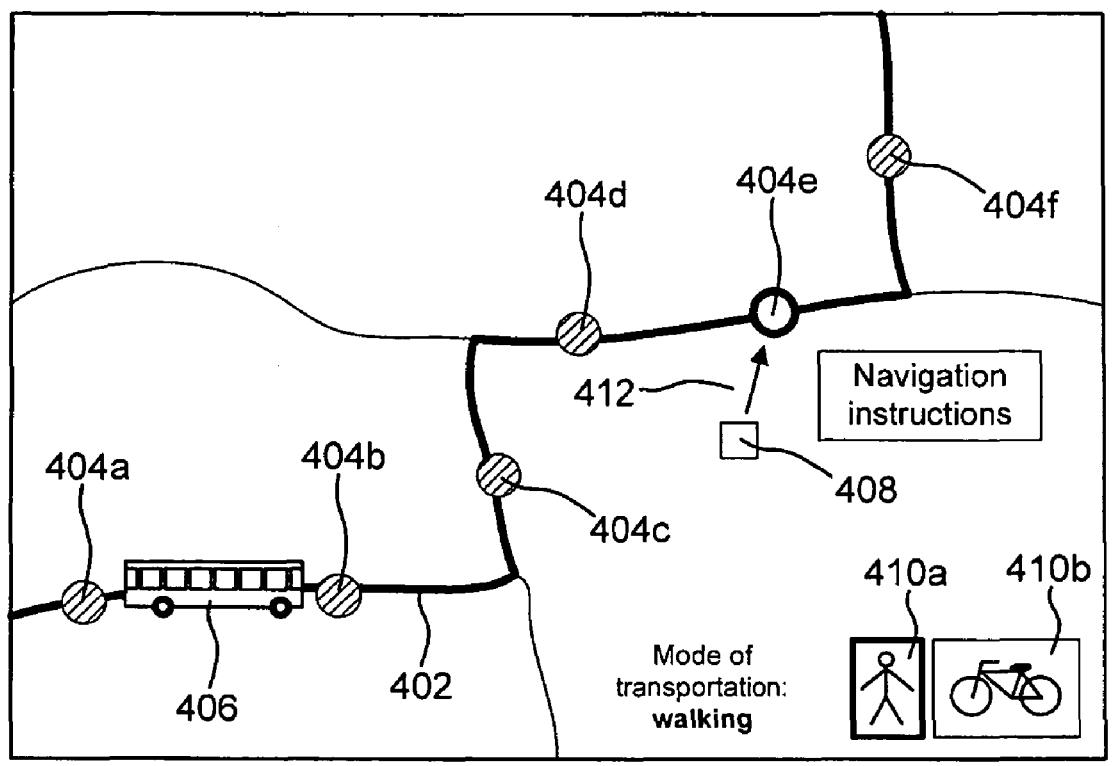
FIGS. 4-8 show display views according to various embodiments.

In step 310 a mode of transportation from the reference position to at least one of the pre-determined positions is received. The mode of transportation may for example be received from a transportation mode database 108. In FIG. 4 different modes of transportation are illustrated by icons 410a-b on in the display view 400. The illustrated modes of transportation represent "walking" and "biking". However, other modes of transportation, such as "driving" and "running", are possible. Each transportation mode is associated with a speed. The speeds may also be comprised in the transportation mode database. For example, the speed associated with "walking" may be 5 km/h while the speed associated with "biking" may be 15 km/h.

Optionally, the mode of transportation may be used as an input to the step 308 of determining connection routes. For example, if the mode of transportation is "walking" the connection routes may be determined such that they comprises paths which are suitable for walking, such as sidewalks and walking paths. Similarly, if the mode of transportation is "biking" the connection routes may comprise paths suitable for biking, such as biking paths or small roads.

Figure 6A:
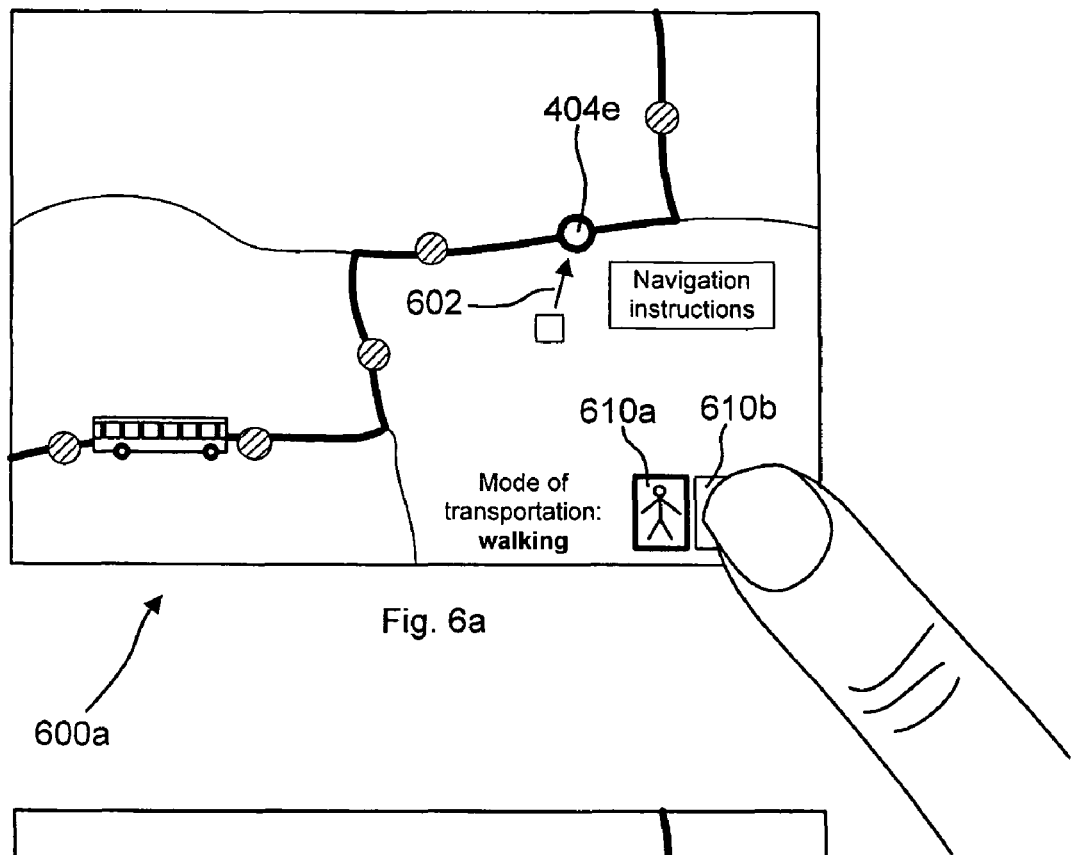
Figure 6B:
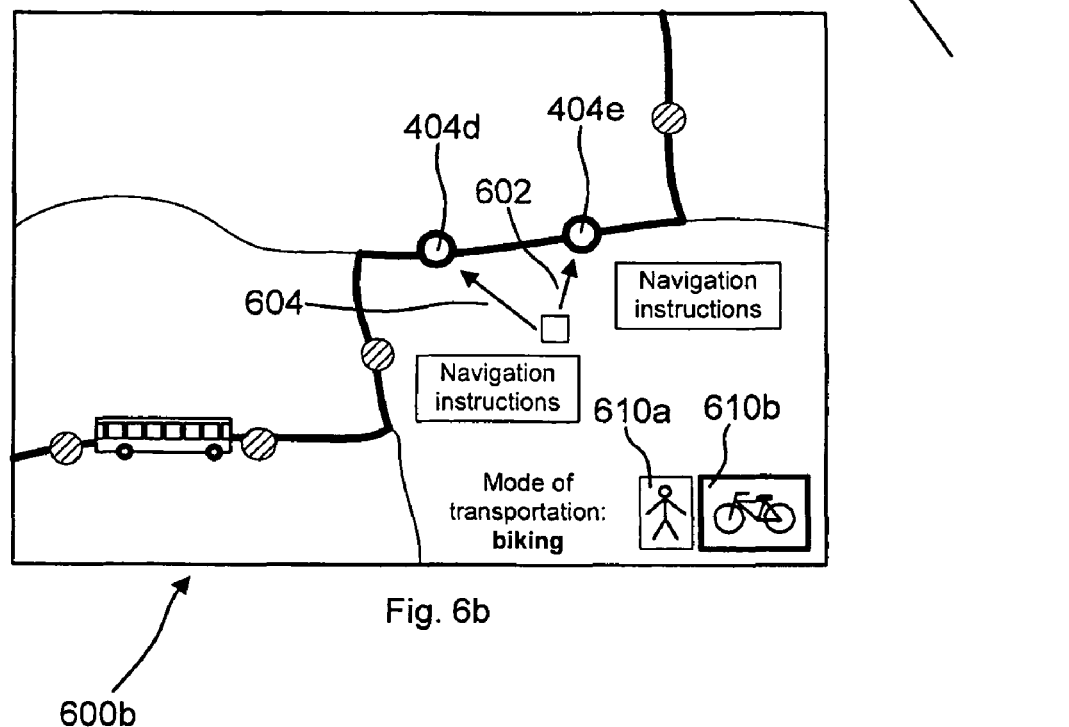

In some embodiments the mode of transportation may be chosen by a user. In FIG. 6a-b an example of such an embodiment is illustrated. In this case the icons 610a-b, which shows a walking person and a bike, respectively, indicate the position of soft key buttons to be used on a pressure sensitive display. Thus, by pressing on one of the soft key buttons, a user may choose a transportation mode. In FIG. 6a the active mode of transportation is "walking". However, by pressing on the icon 610b which illustrates a bike, the user may switch the active mode of transportation to become "biking", as shown in FIG. 6b.

Step 312 comprises determining, for each of the number of connection routes, a time for transportation from the reference position to the at least one of the pre-determined positions. In order to determine the time for transportation, the speed associated with the mode of transportation received in step 310 is used. For example, if the received mode of transportation is associated with a low speed, such as 5 km/h, the time for transportation becomes longer than if the mode of transportation is associated with a higher speed, such as 15 km/h. Thus, in step 312 each connection route is associated with a time for transportation.

In step 314 a reference time point is received. The reference time point may for example be received from the time database 110, a satellite signal or a user input. The reference time point may correspond to a previous or a future time. In particular, it may correspond to a current time.

In step 316 a time of arrival is determined for each of the number of connection routes. The time of arrival is determined by adding the time for transportation to the reference time point. Thus, the time of arrival is the time when a user may arrive at a pre-determined position if he starts from the reference location at the reference time point and uses the mode of transportation received in step 310.

Figure 8:
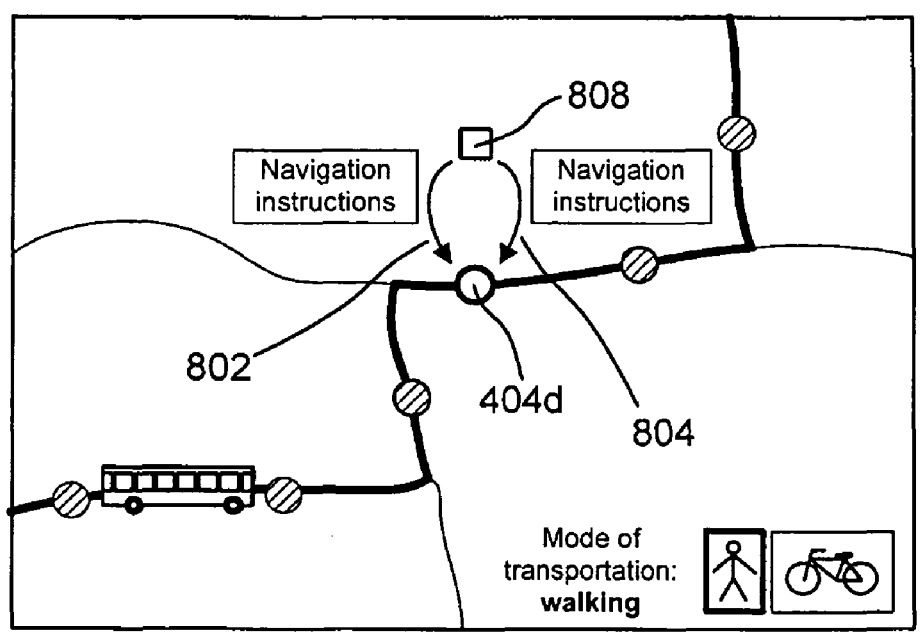

Next, in step 318, at least one recommended connection route is determined. A connection route is set as recommended if the time of arrival at the pre-determined position associated with the connection route is prior to the point of time associated with the pre-determined position according to the time-table data. In other words, referring to the embodiment illustrated in FIG. 4, a connection route 412 may be recommended if a user may reach the pre-determined position before the transportation unit 406 is scheduled to reach it. In the display view 600a of FIG. 6a, only one recommended route 602, corresponding to the pre-determined position 404e, is given. Thus, in the illustrated example, there is only one route for the user to choose from if he wants to reach a pre-determined position before the transportation unit 406 is scheduled to reach it. However, if the user switches the mode of transportation from "walking" to "biking", as previously described, two routes become recommended routes, namely routes 602 and 604 corresponding to the pre-determined positions 404d-e. This is due to the fact that the speed associated with "biking" is generally higher than the speed associated with "walking". Further, several routes being associated with the same pre-determined position may be recommended, as illustrated in FIG. 8 where the routes 802 and 804 both are recommended routes.

In some embodiments the pre-determined positions being associated with recommended routes may be indicated on the display view. For example, in display views 400 and 600a-b of FIGS. 4 and 6a-b the pre-determined positions corresponding to the recommended routes are indicated differently than the other pre-determined positions. The indication may be varied by using different colours, sizes, shapes and/or symbols.

In some embodiments the pre-determined positions associated with the recommended connection routes may be classified into different classes in a step 322. The classification may for example be based on the time of arrival. For example, the difference between the point of time associated with a pre-determined position and the time of arrival at the pre-determined position may be compared to different thresholds. In case the difference is below a first threshold, the pre-determined position is classified into a first class and in case the difference is between a first and second threshold the pre-determined position is classified into a second class etc. By using different classes, one may provide information relating to how likely it is that a user will reach the pre-determined position on time. For example, a first class may correspond to "you have to hurry up" and a second class to "you are in good time".

Figure 7:
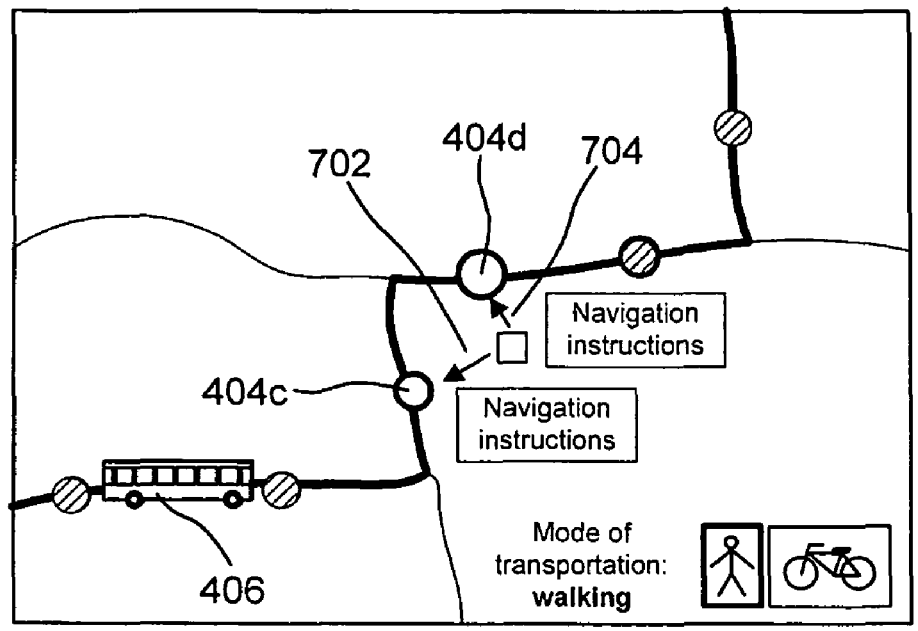

Some embodiments may further comprise a step 324 of indicating the pre-determined positions associated with the recommended connection routes based on their classes. For instance, the pre-determined positions may be indicated in different ways depending on their class. A class may further be associated to different shapes, symbols, sizes and/or colours. For example, in display view 700 of FIG. 7, the pre-determined positions 404c-d associated with the recommended routes 702 and 704 are indicated with different sizes. A larger size may for instance correspond to a pre-determined position which is likely to be reached well in advance of the transportation unit 406, whereas a smaller size may correspond to a pre-determined position which is possible, but less likely, to be reached before the transportation unit 406.

The time table data provides information that relates the pre-determined positions to a point of time. However, every other position along the transportation route may not be related to any points of time. In order to provide temporal information for additional points along the transportation route, the method may in some embodiments comprise the step 326 of determining interpolated position data by using the time table data. The interpolated position data associates points of the transportation route to points of time. The interpolated position data may for instance be determined by linearly interpolating the time table data between the pre-determined positions. Alternatively, other types of interpolation such as spline interpolation may be used. Further, the interpolated position data may be transmitted to a display, such as the display 112. In this way, information relating to a (predicted) current position of the transportation unit along the transportation route may be provided to a user. For example, as shown in FIG. 4, the position of the transportation unit 406 may be shown although it is in between the pre-determined positions 404a-b.

Sometimes a transportation unit following a time table along a certain transportation route becomes delayed or ahead of the time table. In that case, a user may arrive too early to a pre-determined position or he may miss the transportation unit. In order to avoid these situations the method may comprise, in some embodiments, a step 328 of receiving position data associated with a transportation unit and updating the time table data by extrapolating the position data associated with the transportation unit. The position data associated with a transportation unit may for example be received from satellites which are communicating with the transportation unit from a transmitter which is mounted on the transportation unit. Further data pertaining to the position data associated with the transportation unit may be transmitted to the display. In this way a true position of the transportation unit may be shown on the display.

In step 320 data pertaining to the recommended connection route may be transmitted to a display. The transmitted data may for example comprise the recommended route itself and information relating to the pre-determined positions associated with the recommended routes.

Figure 5A:
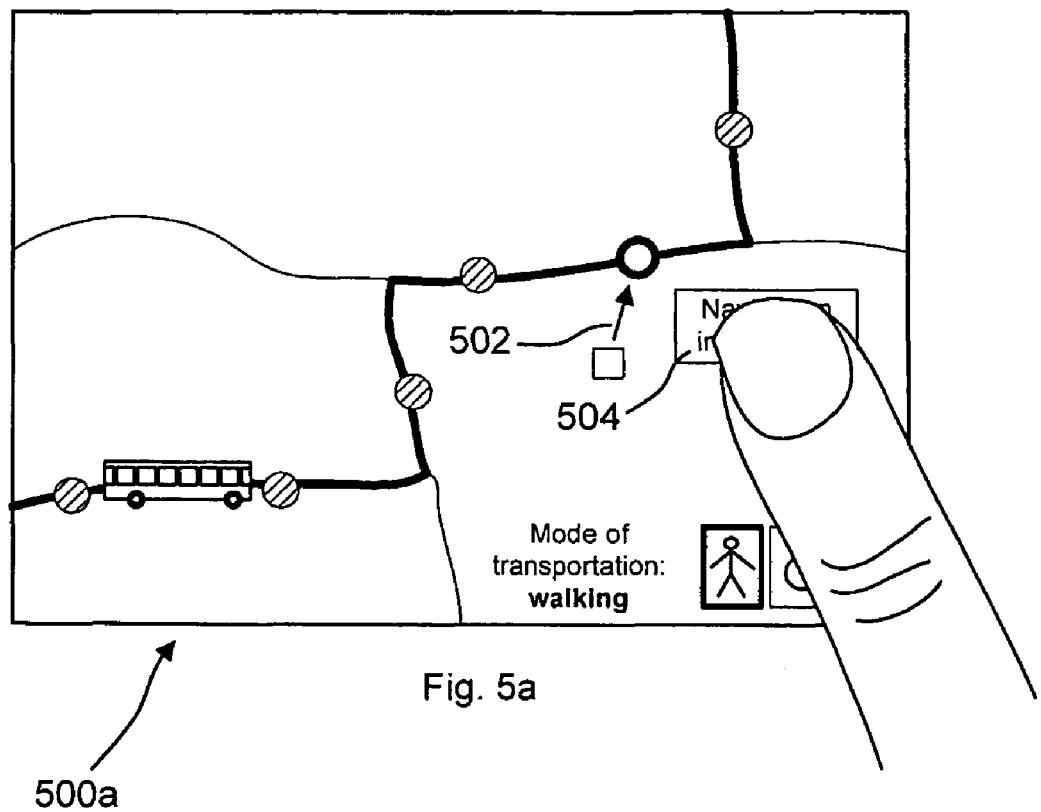

In some embodiments navigation instructions for the recommended routes may be communicated to a user. This may be done in a step 330, comprising determining a selected connection route by receiving a user input, determining navigation instructions based on the selected connection route, and transmitting data pertaining to the navigation instruction to a display. The user input may be received in any known manner. For example it may be received from the user interface 208 or, as illustrated in FIG. 5a by using a soft key button on a pressure sensitive display. In the display view 500a a soft key button 504 with the text "navigation instructions" is shown in connection to a recommended route 502. When a user presses the soft key button, navigation instructions for the recommended route 502 are determined by the processing unit 200. The navigation instructions are then transmitted to the display and a display view 500b showing the navigation instructions may be shown to the user. The navigation instructions may for example be given in the form of an illustrated path along the connection route from the reference point to the pre-determined position corresponding to the selected recommended route, by navigation objects 506 such as arrows or by voice instructions.

Figure 5B:
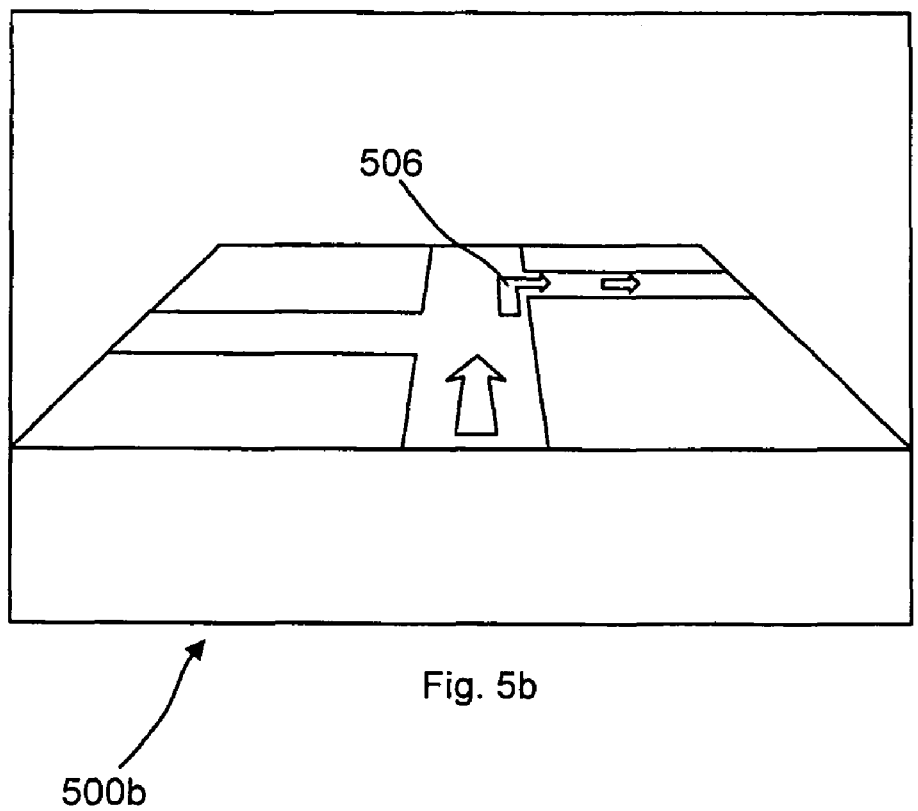

Alternatively or additionally, instead of having a soft button key or similar for switching to a navigation mode as illustrated in FIG. 5a and FIG. 5b, the route of the transportation unit may be displayed in map data comprising roads, etc, and, when the recommended route is determined, this route may be displayed in the map data giving the user navigation information.

If a user has selected a certain connection route he may want to know if he is moving fast enough towards the pre-determined position in order to reach it on time. In order to provide a user with such information, the method may further comprise the step 332 of determining target time data and transmitting the target time data to the display. By target time data is meant data which associates points of the selected connection route with points of time. For example, if a user has five minutes to reach the pre-determined position the target time data may give the user information of how far he should have reached after one minute, two minutes etc. In this way the user may notice whether he has to move faster or if he may slow down and still reach the goal (i.e. the intended terminal or (local) stop) on time. The target time data may be determined by interpolation using the reference time point and the point of time associated to the pre-determined position which in turn is associated to the selected connection route. The interpolation may be done in any known manner, such as linear interpolation or spline interpolation.

Various embodiments discussed herein may be combined with each other in appropriate combinations in connection with the system described herein. Additionally, in some instances, the order of steps in the flowcharts or flow diagrams may be modified, where appropriate. Further, various aspects of the system described herein may be implemented using software, hardware, and/or a combination of software and hardware. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method performed in a device, said method comprising:
    receiving position data associated with a number of pre-determined positions along a transportation route;
    receiving time table data, said time table data associating each of said number of pre-determined positions to a point of time;
    receiving position data associated with a reference position;
    determining a number of connection routes from said reference position to at least one of said pre-determined positions, each of said number of connection routes being associated with one of said pre-determined positions;
    receiving a mode of transportation from said reference position to said at least one of said pre-determined positions, said mode of transportation being associated with a speed;
    determining for each of said number of connection routes a time for transportation from said reference position to said at least one of said pre-determined positions by using said speed;
    receiving a reference time point;
    determining for each of said number of connection routes a time of arrival by adding said time for transportation to said reference time point;
    determining at least one recommended connection route from said reference position to said at least one of said pre-determined positions, by, for each of said number of connection routes, in case said time of arrival is prior to said point of time associated to said pre-determined position associated with said connection route, setting said connection route as a recommended connection route;
    determining a selected connection route by receiving a user input actuation indicating one of said at least one recommended connection route;
    determining target time data, said target time data associating points of said selected connection route with points of time, by interpolation using said reference time point and said point of time associated to a pre-determined position associated to said selected connection route; and
    transmitting data pertaining to said at least one recommended connection route and data pertaining to said target time data to a display.

2. The method according to claim 1, wherein said reference position is a current position of the device.

3. The method according to claim 1, wherein said reference time point is a current time point.

4. The method according to claim 1, further comprising:
classifying the pre-determined positions associated with said at least one recommended connection route into at least one class based on said time of arrival.

5. The method according to claim 4, further comprising:
indicating the pre-determined positions associated with said at least one recommended connection route based on said at least one class.

6. The method according to claim 5, wherein said indicating comprises associating a color with each of said at least one class.

7. The method according to claim 4, wherein said indicating comprises associating a size with each of said at least one class.

8. The method according to claim 1, further comprising:
determining interpolated position data by using said time table data, said interpolated position data associating points of said transportation route to points of time, and
transmitting data pertaining to said interpolated position data to said display.

9. The method according to claim 1, further comprising:
receiving position data associated with a transportation unit,
updating said time table data by extrapolating said position data associated with the transportation unit,
transmitting data pertaining to said position data to said display.

10. The method according to claim 1, further comprising:
determining navigation instructions based on said selected connection route; and
transmitting data pertaining to said navigation instructions to said display.

11. A device, comprising:
a receiver for receiving position data associated with a number of pre-determined positions along a transportation route, time table data, said time table data associating each of said number of pre-determined position to a point of time position data associated with a reference position, a mode of transportation from said reference position to said at least one of said pre-determined positions, said mode of transportation being associated with a speed, and a reference time point;
a processing unit arranged to determine a number of connection routes from said reference position to at least one of said pre-determined positions by using said speed, to determine, for each of said number of connection routes a time of arrival by adding said time for transportation to said reference time point, and to determine at least one recommended connection route from said reference position to said at least one of said pre-determined positions, by, for each of said number of connection routes, in case said time of arrival is prior to said point of time associated to said pre-determined position associated with said connection route, setting said connection route as a recommended connection route, the processing unit being further arranged to determine a selected connection route by receiving a user input actuation indicating one of said at least one recommended connection route, and to determine target time data, said target time data associating points of said selected connection route with points of time, by interpolation using said reference time point and said point of time associated to a pre-determined position associated to said selected connection route; and
a transmitter for transmitting data pertaining to said at least one recommended connection route and data pertaining to said target time data to a display.

12. The device according to claim 11, wherein the processing unit further is arranged to classify the pre-determined positions associated with said at least one recommended connection route into at least one class based on said time of arrival.

13. A system, comprising:
a device including:
a receiver for receiving position data associated with a number of pre-determined positions along a transportation route, time table data, said time table data associating each of said number of pre-determined position to a point of time position data associated with a reference position, a mode of transportation from said reference position to said at least one of said pre-determined positions, said mode of transportation being associated with a speed, and a reference time point;
a processing unit arranged to determine a number of connection routes from said reference position to at least one of said pre-determined positions by using said speed, to determine, for each of said number of connection routes a time of arrival by adding said time for transportation to said reference time point, and to determine at least one recommended connection route from said reference position to said at least one of said pre-determined positions, by, for each of said number of connection routes, in case said time of arrival is prior to said point of time associated to said pre-determined position associated with said connection route, setting said connection route as a recommended connection route, the processor being further arranged to determine a selected connection route by receiving a user input actuation indicating one of said at least one recommended connection route, and to determine target time data, said target time data associating points of said selected connection route with points of time, by interpolation using said reference time point and said point of time associated to a pre-determined position associated to said selected connection route; and
a transmitter for transmitting data pertaining to said at least one recommended connection route and data pertaining to said target time data to a display; and
a display arranged to receive data from said device.

14. The system according to claim 13, wherein the processing unit further is arranged to classify the pre-determined positions associated with said at least one recommended connection route into at least one class based on said time of arrival.

15. A computer program product stored on a computer-readable medium comprising computer program code portions, the computer program product comprising:
executable code that receives position data associated with a number of pre-determined positions along a transportation route;
executable code that receives time table data, said time table data associating each of said number of pre-determined positions to a point of time;
executable code that receives position data associated with a reference position;
executable code that determines a number of connection routes from said reference position to at least one of said pre-determined positions, each of said number of connection routes being associated with one of said pre-determined positions;
executable code that receives a mode of transportation from said reference position to said at least one of said pre-determined positions, said mode of transportation being associated with a speed;

executable code that determines for each of said number of connection routes a time for transportation from said reference position to said at least one of said pre-determined positions by using said speed;

executable code that receives a reference time point;

executable code that determines for each of said number of connection routes a time of arrival by adding said time for transportation to said reference time point;

executable code that determines at least one recommended connection route from said reference position to said at least one of said pre-determined positions, by, for each of said number of connection routes, in case said time of arrival is prior to said point of time associated to said pre-determined position associated with said connection route, setting said connection route as a recommended connection route; and executable code that transmits data pertaining to said at least one recommended connection route to a display.

16. The computer program product according to claim 15, further comprising:

executable code that classifies the pre-determined positions associated with said at least one recommended connection route into at least one class based on said time of arrival.

17. The computer program product according to claim 15, further comprising:

executable code that determines interpolated position data by using said time table data, said interpolated position data associating points of said transportation route to points of time, and executable code that transmits data pertaining to said interpolated position data to said display.

18. The computer program product according to claim 15, further comprising:

executable code that receives position data associated with a transportation unit, executable code that updates said time table data by extrapolating said position data associated with the transportation unit, executable code that transmits data pertaining to said position data to said display.

19. The computer program product according to claim 15, further comprising:

executable code that determines a selected connection route by receiving a user input actuation indicating one of said at least one recommended connection route;

executable code that determines navigation instructions based on said selected connection route; and executable code that transmits data pertaining to said navigation instructions to said display.

\* \* \* \* \*